(12) United States Patent
Yue et al.

(10) Patent No.: US 10,767,936 B2
(45) Date of Patent: Sep. 8, 2020

(54) TRANS-SEASONAL COLD-STORAGE HEAT-STORAGE SYSTEM

(71) Applicant: CHINA STATE CONSTRUCTION ENGINEERING CORPORATION LIMITED, Beijing (CN)

(72) Inventors: Yuliang Yue, Beijing (CN); Yuesong Qi, Beijing (CN); Dongli Yuan, Beijing (CN); Pengcheng Sun, Beijing (CN); Hui Zhou, Beijing (CN)

(*) Notice: Subject to any disclaimer, the term of this patent is extended or adjusted under 35 U.S.C. 154(b) by 178 days.

(21) Appl. No.: 16/199,170

(22) Filed: Nov. 24, 2018

(65) Prior Publication Data

US 2019/0093959 A1 Mar. 28, 2019

Related U.S. Application Data

(63) Continuation of application No. PCT/CN2017/109919, filed on Nov. 8, 2017.

(30) Foreign Application Priority Data

Sep. 26, 2017 (CN) .......................... 2017 1 0883769

(51) Int. Cl.
*F28D 1/06* (2006.01)
*F28D 20/02* (2006.01)
(Continued)

(52) U.S. Cl.
CPC .......... *F28D 20/021* (2013.01); *F24F 5/0017* (2013.01); *F25B 25/005* (2013.01);
(Continued)

(58) Field of Classification Search
CPC .. F25B 2339/047; F25B 25/005; F25B 39/02; F25B 39/04; F25B 5/00; F28D 1/0213;
(Continued)

(56) References Cited

U.S. PATENT DOCUMENTS

2002/0179298 A1* 12/2002 Kopko ................ F28D 20/0043
165/201
2009/0173336 A1* 7/2009 Leifer ................. F28D 20/0034
126/617
2016/0231004 A1* 8/2016 Kawaji ................... F28D 20/00

FOREIGN PATENT DOCUMENTS

CN 205299850 U 6/2016

* cited by examiner

*Primary Examiner* — Filip Zec
(74) *Attorney, Agent, or Firm* — W&K IP

(57) ABSTRACT

The present invention discloses a trans-seasonal cold-storage heat-storage system, comprising an ice-source heat pump, an ice-making machine set, a trans-seasonal energy-storage tank, an exergonic heat exchanger, an air conditioning pump and a cooling heat-storage pump, wherein the condenser in the ice-source heat pump communicates sequentially with the cooling heat-storage pump and the cooling tower via a circulation pipeline, the condenser in the ice-source heat pump further communicates sequentially with the cooling heat-storage pump and the trans-seasonal energy-storage tank via a circulation pipeline, the condenser in the ice-source heat pump further communicates sequentially with the air conditioning pump and the air conditioning cold and heat terminal via a circulation pipeline, to form a circulation loop for supplying heat to the air conditioning cold and heat terminal in winter.

9 Claims, 18 Drawing Sheets

(51) Int. Cl.

| | |
|---|---|
| *F25B 39/02* | (2006.01) |
| *F25B 39/04* | (2006.01) |
| *F28D 1/02* | (2006.01) |
| *F28D 1/047* | (2006.01) |
| *F25B 25/00* | (2006.01) |
| *F28D 20/00* | (2006.01) |
| *F24F 5/00* | (2006.01) |
| *F25B 5/00* | (2006.01) |

(52) U.S. Cl.
CPC .............. *F25B 39/02* (2013.01); *F25B 39/04* (2013.01); *F28D 1/0213* (2013.01); *F28D 1/0472* (2013.01); *F28D 1/0477* (2013.01); *F28D 1/06* (2013.01); *F28D 20/0043* (2013.01); *F25B 5/00* (2013.01); *F25B 2339/047* (2013.01); *F28D 2020/0013* (2013.01); *F28D 2020/0078* (2013.01)

(58) Field of Classification Search
CPC ........ F28D 1/0472; F28D 1/0477; F28D 1/06; F28D 2020/0013; F28D 2020/0078; F28D 20/0043; F28D 20/02; F24F 5/0017
See application file for complete search history.

TRANS-SEASONAL COLD-STORAGE HEAT-STORAGE SYSTEM

CROSS-REFERENCE TO RELATED APPLICATIONS

This application is a continuation of International Patent Application No. PCT/CN2017/109919 with a filing date of Nov. 8, 2017, designating the United States, now pending, and further claims priority to Chinese Patent Application No. 201710883769.6 with a filing date of Sep. 26, 2017. The content of the aforementioned applications, including any intervening amendments thereto, are incorporated herein by reference.

TECHNICAL FIELD

The present invention relates to a trans-seasonal cold-storage heat-storage system, and belongs to the technical field of cold supplying and heat supplying by a heat pump.

BACKGROUND ART

Currently, trans-seasonal energy storage is a hot topical at home and abroad, and has a huge potential in energy conservation. However, according to the current research findings and practical applications, the fundamental principle substantially is storing heat by using the solar energy of spring, summer and autumn, to be used in winter, and there is no breakthrough in the principle. Regarding mid-latitude regions such as China, the United States and Europe, the summer is blazing hot and the winter is chill, so both of air conditioner and heat supplying are required. The conventional trans-seasonal heat storage technique can merely satisfy the requirement on heat supplying in winter, and is suitable for high-latitude and highly cold regions.

Along with the growth in the living standard of people, the areas in China that need heat supplying increasingly expand, and currently constructions in the area to the south of the Qinling Mountains and the Huai River also need heat supplying at a large scale. In the northern area, pollution and haze in winter are becoming increasingly serious, and all of the provinces or cities have proposed programs of abandoning coal and employing electricity or abandoning coal and employing natural gas. However, those reconstruction programs usually require a large amount of supporting subsidy from the government to perform.

The prior art cannot conduct trans-seasonal storage to the heat discharged during cold production in summer and the cold discharged during heat production in winter, which causes energy consumption, and has a high operating cost. Therefore, a trans-seasonal cold-storage heat-storage system is urgently needed to solve the above problems.

SUMMARY OF THE DISCLOSURE

In view of the disadvantages of the prior art, the object of the present invention is to provide a trans-seasonal cold-storage heat-storage system, to solve the problems raised in the above background art. The present invention is convenient to use, is easy to operate, has a high stability and has a good reliability.

In order to realize the above object, the trans-seasonal cold-storage heat-storage system that is provided by the present invention has two implementing solutions. One is a static coil-pipe ice-manufacturing trans-seasonal cold-storage heat-storage system, wherein the system comprises a cooling tower, an ice-source heat pump, a cooling heat-storage pump, a cold-storage pump, an ice-source pump, a trans-seasonal energy-storage tank, a trans-seasonal ice-storage coil pipe, an exergonic pump, an exergonic heat exchanger, an air conditioning pump and an air conditioning cold and heat terminal, wherein the ice-source heat pump comprises a condenser and an evaporator, and the trans-seasonal ice-storage coil pipe is provided within the trans-seasonal energy-storage tank; the condenser in the ice-source heat pump communicates sequentially with the cooling heat-storage pump and the cooling tower via a circulation pipeline, to form a circulation loop for exhausting heat to an outdoor environment in summer cold supplying, the condenser in the ice-source heat pump further communicates sequentially with the cooling heat-storage pump and the trans-seasonal energy-storage tank via a circulation pipeline, to form a circulation loop for conducting trans-seasonal heat storage to the trans-seasonal energy-storage tank in summer cold supplying, and the condenser in the ice-source heat pump further communicates sequentially with the air conditioning pump and the air conditioning cold and heat terminal via a circulation pipeline, to form a circulation loop for supplying heat to the air conditioning cold and heat terminal in winter; the evaporator in the ice-source heat pump communicates sequentially with the cold-storage pump and the trans-seasonal energy-storage tank via a circulation pipeline, to form a circulation loop for conducting cold storage to the trans-seasonal energy-storage tank in summer cold supplying, the evaporator in the ice-source heat pump further communicates sequentially with the exergonic pump and the exergonic heat exchanger via a circulation pipeline, to form a circulation loop for releasing cold to the exergonic heat exchanger in summer cold supplying, and the evaporator in the ice-source heat pump further communicates sequentially with the ice-source pump and the trans-seasonal ice-storage coil pipe via a circulation pipeline, wherein the pipeline is filled with an antifreezing agent, to form a circulation loop for a lower-temperature heat source in winter heat supplying, and also serve as a cold source for trans-seasonal cold storage; and the trans-seasonal energy-storage tank communicates sequentially with the exergonic pump and the exergonic heat exchanger via a circulation pipeline, to form an exergonic circulation loop for summer cold releasing and winter heat releasing, and the exergonic heat exchanger further communicates sequentially with the air conditioning pump and the air conditioning cold and heat terminal, to form a circulation loop for summer cold supplying and winter heat supplying of the air conditioning cold and heat terminal.

Optionally, the ice-source heat pump is provided therein with one first evaporator, wherein the first evaporator communicates sequentially with the cold-storage pump and the trans-seasonal energy-storage tank via a circulation pipeline, to form a circulation loop for conducting cold storage to the trans-seasonal energy-storage tank in summer cold supplying, the first evaporator further communicates sequentially with the exergonic pump and the exergonic heat exchanger via a circulation pipeline, to form a circulation loop for releasing cold to the exergonic heat exchanger in summer cold supplying, and the first evaporator further communicates sequentially with the ice-source pump and the trans-seasonal ice-storage coil pipe via a circulation pipeline, wherein the pipeline is filled with an antifreezing agent, to form a circulation loop for a lower-temperature heat source in winter heat supplying, and also serve as a cold source for trans-seasonal cold storage;

or the ice-source heat pump is provided therein with one first evaporator and one second evaporator, wherein the first evaporator communicates sequentially with the cold-storage pump and the trans-seasonal energy-storage tank via a circulation pipeline, to form a circulation loop for conducting cold storage to the trans-seasonal energy-storage tank in summer cold supplying, the first evaporator further communicates sequentially with the exergonic pump and the exergonic heat exchanger via a circulation pipeline, to form a circulation loop for releasing cold to the exergonic heat exchanger in summer cold supplying, and the second evaporator further communicates sequentially with the ice-source pump and the trans-seasonal ice-storage coil pipe via a circulation pipeline, wherein the pipeline is filled with an antifreezing agent, to form a circulation loop for a lower-temperature heat source in winter heat supplying, and also serve as a cold source for trans-seasonal cold storage.

Optionally, the static coil-pipe ice-manufacturing trans-seasonal cold-storage heat-storage system is provided therein with one trans-seasonal energy-storage tank, or the trans-seasonal cold-storage heat-storage system is provided therein with a plurality of trans-seasonal energy-storage tanks, and the plurality of trans-seasonal energy-storage tanks are connected in parallel.

Optionally, an external surface of the trans-seasonal energy-storage tank is provided with a heat insulation cotton plate or other heat-insulation temperature-keeping measures.

Optionally, the trans-seasonal ice-storage coil pipe is arranged within the trans-seasonal energy-storage tank serpentine-wisely, or arranged within the trans-seasonal energy-storage tank in other forms.

The second is a dynamic ice-manufacturing trans-seasonal cold-storage heat-storage system, wherein the system comprises a cooling tower, an ice-source heat pump, a cooling heat-storage pump, a cold-storage pump, an ice-source pump, an ice-slurry pump, an ice-making machine set, a trans-seasonal energy-storage tank, an exergonic pump, an exergonic heat exchanger, an air conditioning pump and an air conditioning cold and heat terminal, wherein the ice-source heat pump comprises a condenser and an evaporator; the condenser in the ice-source heat pump communicates sequentially with the cooling heat-storage pump and the cooling tower via a circulation pipeline, to form a circulation loop for exhausting heat to an outdoor environment in summer cold supplying, the condenser in the ice-source heat pump further communicates sequentially with the cooling heat-storage pump and the trans-seasonal energy-storage tank via a circulation pipeline, to form a circulation loop for conducting trans-seasonal heat storage to the trans-seasonal energy-storage tank in summer cold supplying, and the condenser in the ice-source heat pump further communicates sequentially with the air conditioning pump and the air conditioning cold and heat terminal via a circulation pipeline, to form a circulation loop for supplying heat to the air conditioning cold and heat terminal in winter; the evaporator in the ice-source heat pump communicates sequentially with the cold-storage pump and the trans-seasonal energy-storage tank via a circulation pipeline, to form a circulation loop for conducting cold storage to the trans-seasonal energy-storage tank in summer cold supplying, the evaporator in the ice-source heat pump further communicates sequentially with the exergonic pump and the exergonic heat exchanger via a circulation pipeline, to form a circulation loop for releasing cold to the exergonic heat exchanger in summer cold supplying, and the evaporator in the ice-source heat pump further communicates sequentially with the ice-source pump and the ice-making machine set via a circulation pipeline, wherein the pipeline is filled with an antifreezing agent, to form a circulation loop for a lower-temperature heat source in winter heat supplying, and also serve as a cold source for trans-seasonal cold storage; and the ice-making machine set communicates sequentially with the ice-slurry pump and the trans-seasonal energy-storage tank via a circulation pipeline, to form a trans-seasonal cold storage circulation loop, the trans-seasonal energy-storage tank communicates sequentially with the exergonic pump and the exergonic heat exchanger via a circulation pipeline, to form an exergonic circulation loop for summer cold releasing and winter heat releasing, and the exergonic heat exchanger further communicates sequentially with the air conditioning pump and the air conditioning cold and heat terminal via a circulation pipeline, to form a circulation loop for summer cold supplying and winter heat supplying of the air conditioning cold and heat terminal.

Optionally, the ice-source heat pump is provided therein with one first evaporator, wherein the first evaporator communicates sequentially with the cold-storage pump and the trans-seasonal energy-storage tank via a circulation pipeline, to form a circulation loop for conducting cold storage to the trans-seasonal energy-storage tank in summer cold supplying, the first evaporator further communicates sequentially with the exergonic pump and the exergonic heat exchanger via a circulation pipeline, to form a circulation loop for releasing cold to the exergonic heat exchanger in summer cold supplying, and the first evaporator further communicates sequentially with the ice-source pump and the ice-making machine set via a circulation pipeline, wherein the pipeline is filled with an antifreezing agent, to form a circulation loop for a lower-temperature heat source in winter heat supplying, and also serve as a cold source for trans-seasonal cold storage;

or the ice-source heat pump is provided therein with one first evaporator and one second evaporator, wherein the first evaporator communicates sequentially with the cold-storage pump and the trans-seasonal energy-storage tank via a circulation pipeline, to form a circulation loop for conducting cold storage to the trans-seasonal energy-storage tank in summer cold supplying, the first evaporator further communicates sequentially with the exergonic pump and the exergonic heat exchanger via a circulation pipeline, to form a circulation loop for releasing cold to the exergonic heat exchanger in summer cold supplying, and the second evaporator communicates sequentially with the ice-source pump and the ice-making machine set via a circulation pipeline, wherein the pipeline is filled with an antifreezing agent, to form a circulation loop for a lower-temperature heat source in winter heat supplying, and also serve as a cold source for trans-seasonal cold storage.

Optionally, the dynamic ice-manufacturing trans-seasonal cold-storage heat-storage system is provided therein with one trans-seasonal energy-storage tank, or the trans-seasonal cold-storage heat-storage system is provided therein with a plurality of trans-seasonal energy-storage tanks, and the plurality of trans-seasonal energy-storage tanks are connected in parallel.

Optionally, the outlet of the air conditioning pump connects to the exergonic heat exchanger, and the inlet of the air conditioning pump connects to the air conditioning cold and heat terminal.

Optionally, an external surface of the trans-seasonal energy-storage tank is provided with a heat insulation cotton plate or other heat-insulation temperature-keeping measures.

The advantageous effects of the present invention are: the trans-seasonal cold-storage heat-storage system of the present invention is provided with a cooling tower, an ice-source heat pump, an ice-making machine set, a trans-seasonal energy-storage tank, an exergonic pump, an exergonic heat exchanger, an air conditioning cold and heat terminal, an air conditioning pump, an ice-slurry pump, an ice-source pump, a cold-storage pump and a cooling heat-storage pump. The design realizes trans-seasonal cold storage and heat storage, by making water into ice in winter, to be used for cold production in summer, and can also store the heat discharged during cold production in summer to be used for heat supplying in winter, which greatly reduces the operation cost of projects. The present invention has a reasonable structure, complete functions, a good practical applicability, a high stability and a good reliability. The substantial breakthrough is that in winter the water phase is converted into ice, and the discharged latent heat is used for heat supplying, which greatly reduces the volume of the energy storage tank.

BRIEF DESCRIPTION OF THE DRAWINGS

By reading the detailed description of the non-limiting embodiments by referring to the following figures, the other features, objects and advantages of the present invention will become more apparent.

Figure 1:
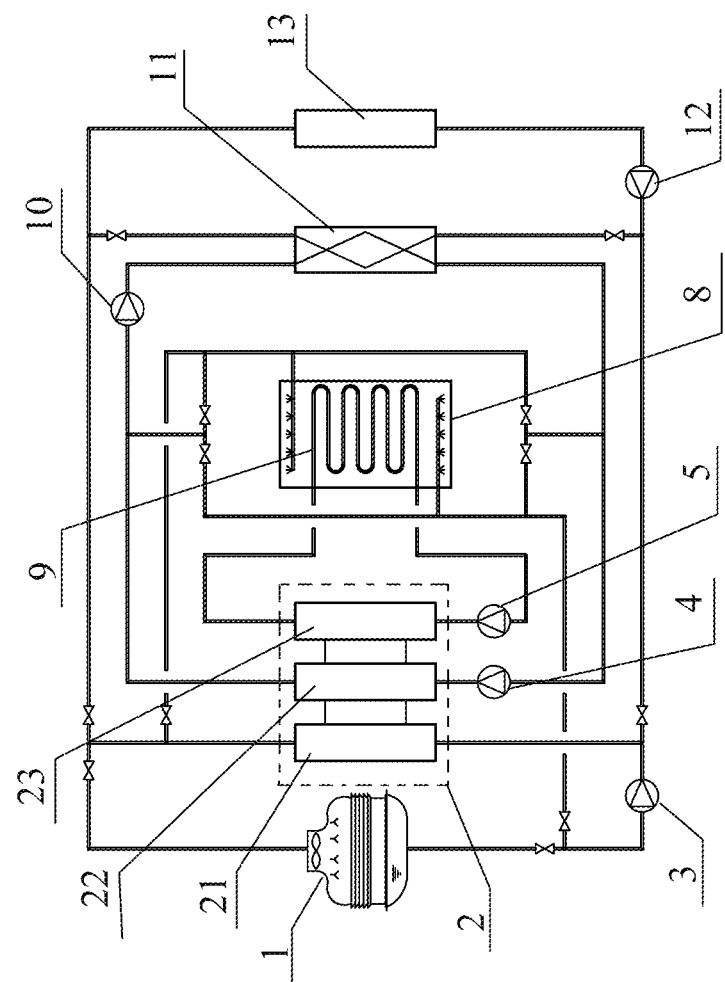
FIG. 1 is the schematic diagram of the first embodiment of the static coil-pipe ice-manufacturing trans-seasonal cold-storage heat-storage system.
Figure 2:
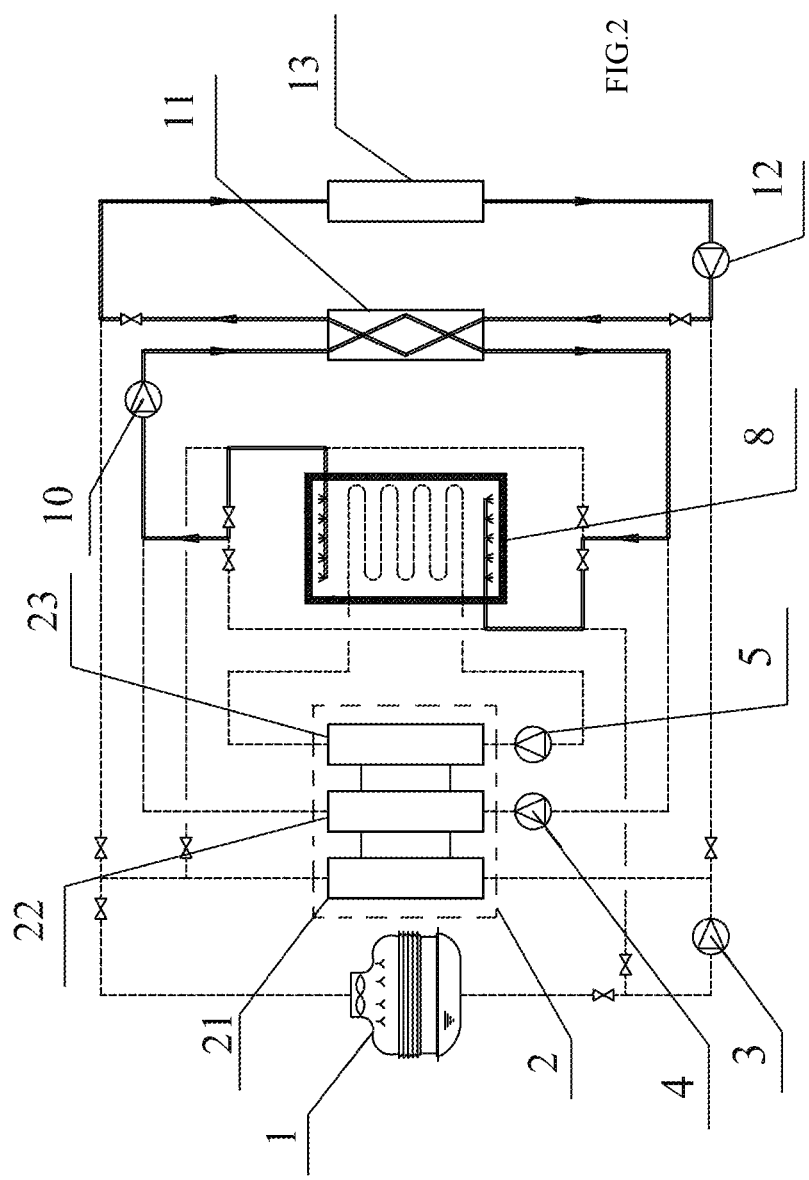
FIG. 2 is the schematic diagram of the direct heat supplying by the trans-seasonal energy-storage tank in winter of the first embodiment of the static coil-pipe ice-manufacturing trans-seasonal cold-storage heat-storage system.
Figure 3:
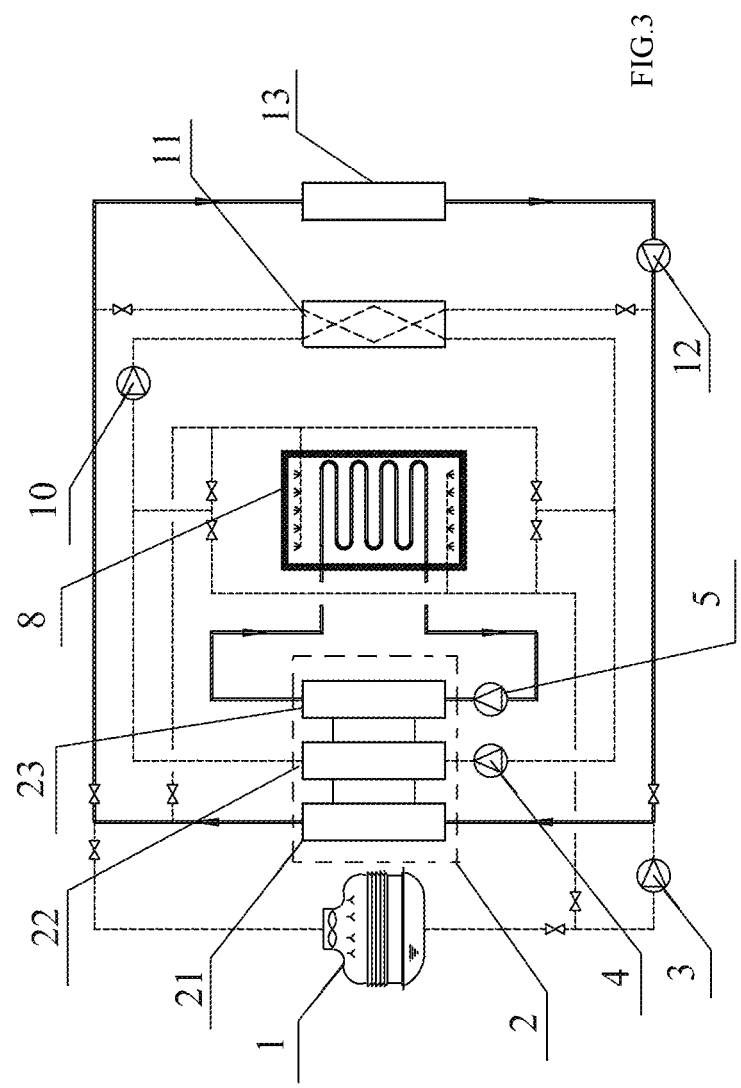
FIG. 3 is the schematic diagram of the heat supplying and trans-seasonal cold storage by the ice-source heat pump in winter of the first embodiment of the static coil-pipe ice-manufacturing trans-seasonal cold-storage heat-storage system.
Figure 4:
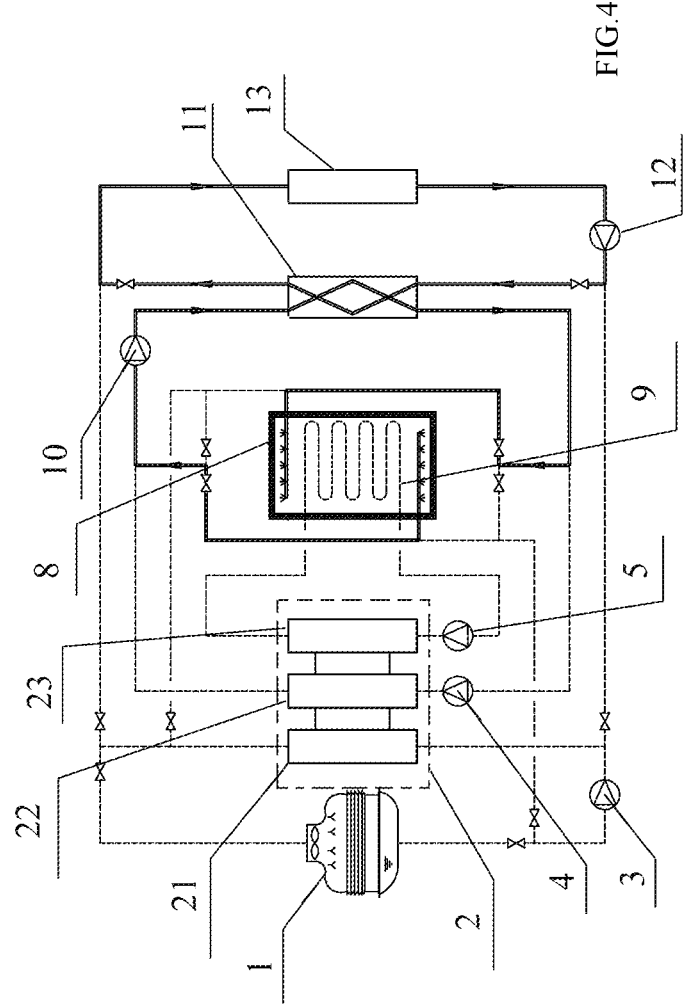
FIG. 4 is the schematic diagram of the direct cold supplying by the trans-seasonal energy-storage tank in summer of the first embodiment of the static coil-pipe ice-manufacturing trans-seasonal cold-storage heat-storage system.
Figure 5:
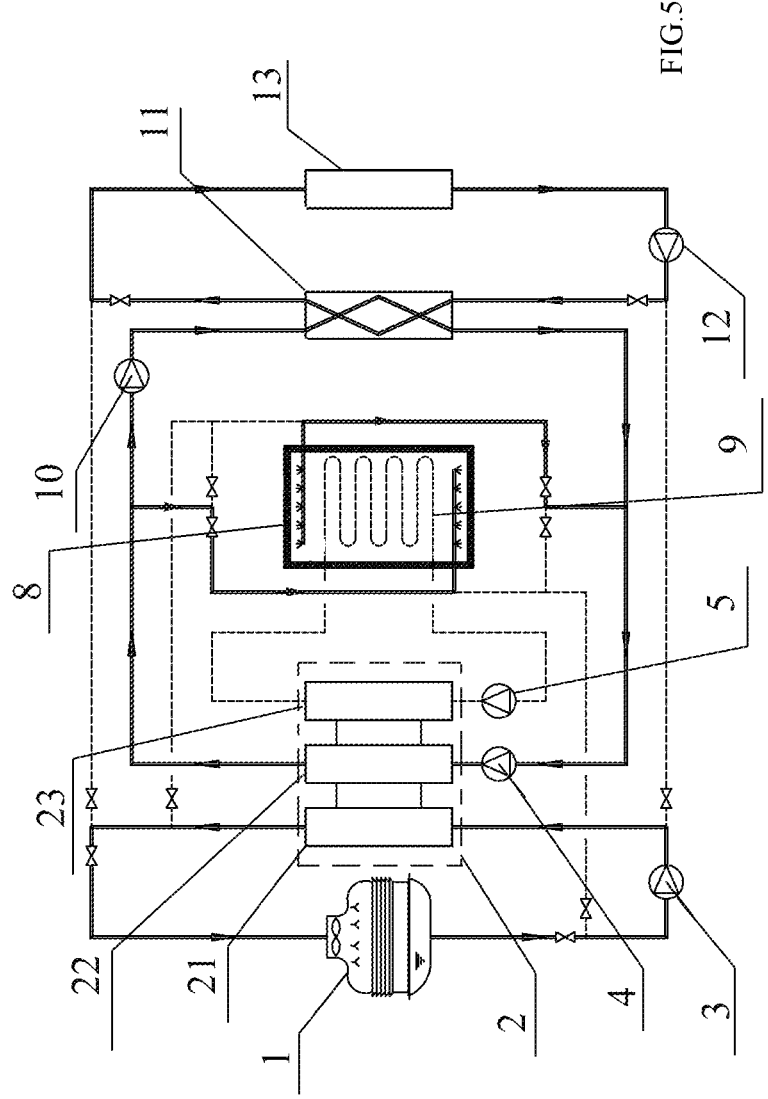
FIG. 5 is the schematic diagram of the cold storage and cold supplying by the ice-source heat pump in summer of the first embodiment of the static coil-pipe ice-manufacturing trans-seasonal cold-storage heat-storage system.
Figure 6:
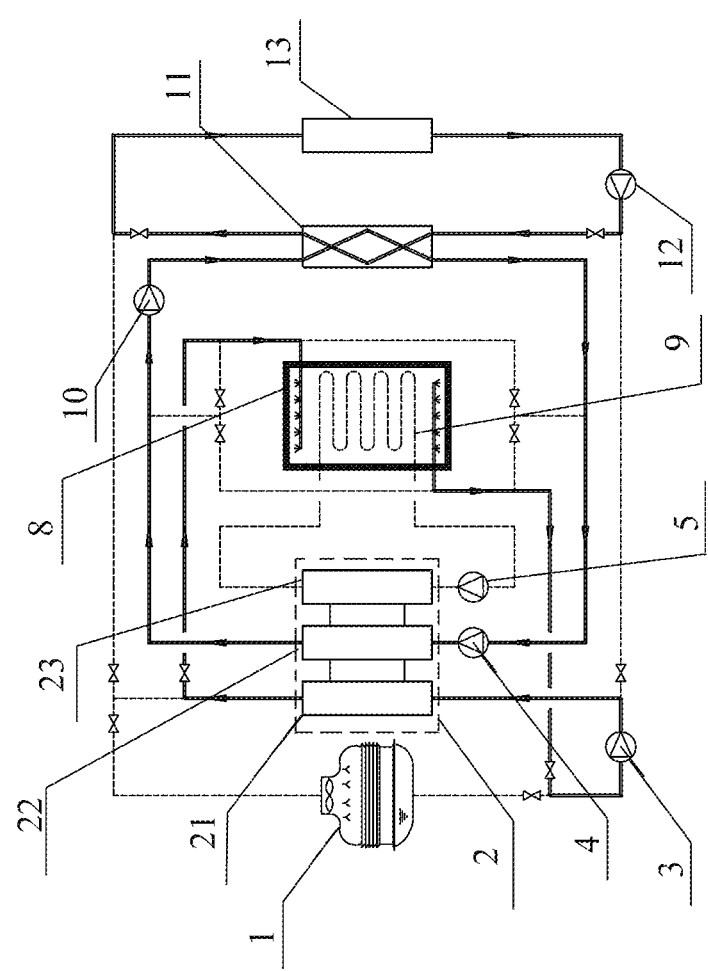
FIG. 6 is the schematic diagram of the cold supplying by the heat pump and trans-seasonal heat storage in summer of the first embodiment of the static coil-pipe ice-manufacturing trans-seasonal cold-storage heat-storage system.

In the drawings: 1—cooling tower, 2—ice-source heat pump, 21—condenser, 22—first evaporator, 23—second evaporator, 3—cooling heat-storage pump, 4—cold-storage pump, 5—ice-source pump, 6—ice-slurry pump, 7—ice-making machine set, 8—trans-seasonal energy-storage tank, 9—trans-seasonal ice-storage coil pipe, 10—exergonic pump, 11—exergonic heat exchanger, 12—air conditioning pump, and 13—air conditioning cold and heat terminal.

PARTICULAR EMBODIMENTS

In order to enable the technical means, characteristics, objects and effects of the implementation of the present invention easily understandable, the present invention is further described below by referring to particular embodiments.

Referring to FIGS. 1-9, the first technical solution that is provided by the present invention: a static coil-pipe ice-manufacturing trans-seasonal cold-storage heat-storage system, wherein the system comprises a cooling tower 1, an ice-source heat pump 2, a cooling heat-storage pump 3, a cold-storage pump 4, an ice-source pump 5, a trans-seasonal energy-storage tank 8, a trans-seasonal ice-storage coil pipe 9, an exergonic pump 10, an exergonic heat exchanger 11, an air conditioning pump 12 and an air conditioning cold and heat terminal 13, wherein the ice-source heat pump 2 comprises a condenser 21 and an evaporator, and the trans-seasonal ice-storage coil pipe 9 is provided within the trans-seasonal energy-storage tank 8; the condenser 21 in the ice-source heat pump 2 communicates sequentially with the cooling heat-storage pump 3 and the cooling tower 1 via a circulation pipeline, to form a circulation loop for exhausting heat to an outdoor environment in summer cold supplying, the condenser 21 in the ice-source heat pump 2 further communicates sequentially with the cooling heat-storage pump 3 and the trans-seasonal energy-storage tank 8 via a circulation pipeline, to form a circulation loop for conducting trans-seasonal heat storage to the trans-seasonal energy-storage tank 8 in summer cold supplying, and the condenser 21 in the ice-source heat pump 2 further communicates sequentially with the air conditioning pump 12 and the air conditioning cold and heat terminal 13 via a circulation pipeline, to form a circulation loop for supplying heat to the air conditioning cold and heat terminal 13 in winter; the evaporator in the ice-source heat pump 2 communicates sequentially with the cold-storage pump 4 and the trans-seasonal energy-storage tank 8 via a circulation pipeline, to form a circulation loop for conducting cold storage to the trans-seasonal energy-storage tank 8 in summer cold supplying, the evaporator in the ice-source heat pump 2 further communicates sequentially with the exergonic pump 10 and the exergonic heat exchanger 11 via a circulation pipeline, to form a circulation loop for releasing cold to the exergonic heat exchanger 11 in summer cold supplying, and the evaporator in the ice-source heat pump 2 further communicates sequentially with the ice-source pump 5 and the trans-seasonal ice-storage coil pipe 9 via a circulation pipeline, wherein the pipeline is filled with an antifreezing agent, to form a circulation loop for a lower-temperature heat source in winter heat supplying, and also serve as a cold source for trans-seasonal cold storage; and the trans-seasonal energy-storage tank 8 communicates sequentially with the exergonic pump 10 and the exergonic heat exchanger 11 via a circulation pipeline, to form an exergonic circulation loop for summer cold releasing and winter heat releasing, and the exergonic heat exchanger 11 further communicates sequentially with the air conditioning pump 12 and the air conditioning cold and heat terminal 13 via a circulation pipeline, to form a circulation loop for summer cold supplying and winter heat supplying of the air conditioning cold and heat terminal 13.

Referring to FIG. 1, in the first embodiment of the static coil-pipe ice-manufacturing trans-seasonal cold-storage heat-storage system, the ice-source heat pump 2 is provided therein with one first evaporator 22 and one second evaporator 23, wherein the first evaporator 22 communicates sequentially with the cold-storage pump 4 and the trans-seasonal energy-storage tank 8 via a circulation pipeline, to form a circulation loop for conducting cold storage to the trans-seasonal energy-storage tank 8 in summer cold supplying, the first evaporator 22 further communicates sequentially with the exergonic pump 10 and the exergonic heat exchanger 11 via a circulation pipeline, to form a circulation loop for releasing cold to the exergonic heat exchanger 11 in summer cold supplying, and the second evaporator 23 communicates sequentially with the ice-source pump 5 and the trans-seasonal ice-storage coil pipe 9 via a circulation pipeline, wherein the pipeline is filled with an antifreezing agent, to form a circulation loop for a lower-temperature heat source in winter heat supplying, and also serve as a cold source for trans-seasonal cold storage.

Figure 7:
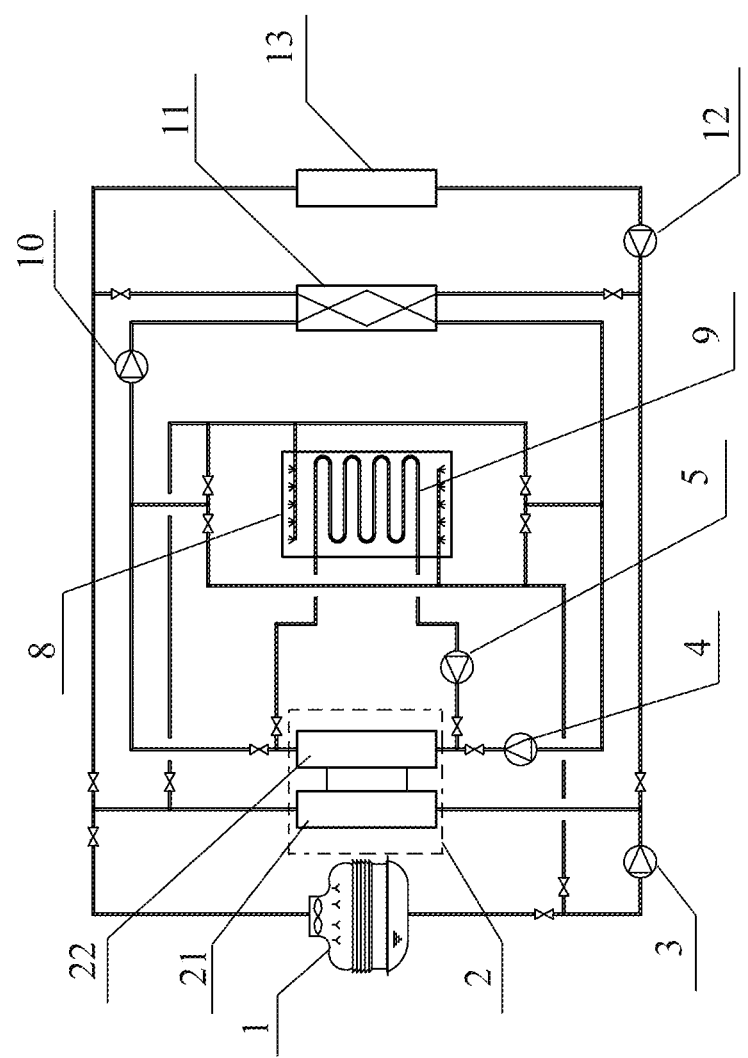
FIG. 7 is the schematic diagram of the second embodiment of the static coil-pipe ice-manufacturing trans-seasonal cold-storage heat-storage system.

Referring to FIG. 7, in the second embodiment of the static coil-pipe ice-manufacturing trans-seasonal cold-storage heat-storage system, the ice-source heat pump 2 is provided therein with one first evaporator 22, wherein the first evaporator 22 communicates sequentially with the cold-storage pump 4 and the trans-seasonal energy-storage tank 8 via a circulation pipeline, to form a circulation loop for conducting cold storage to the trans-seasonal energy-storage tank 8 in summer cold supplying, the first evaporator 22 further communicates sequentially with the exergonic pump 10 and the exergonic heat exchanger 11 via a circulation pipeline, to form a circulation loop for releasing cold to the exergonic heat exchanger 11 in summer cold supplying, and the first evaporator 22 further communicates sequentially with the ice-source pump 5 and the trans-seasonal ice-storage coil pipe 9 via a circulation pipeline, wherein the pipeline is filled with an antifreezing agent, to form a circulation loop for a lower-temperature heat source in winter heat supplying, and also serve as a cold source for trans-seasonal cold storage.

Referring to FIGS. 1 and 7, in the first embodiment and the second embodiment of the static coil-pipe ice-manufacturing trans-seasonal cold-storage heat-storage system, the trans-seasonal cold-storage heat-storage system is provided therein with one trans-seasonal energy-storage tank 8.

Figure 8:
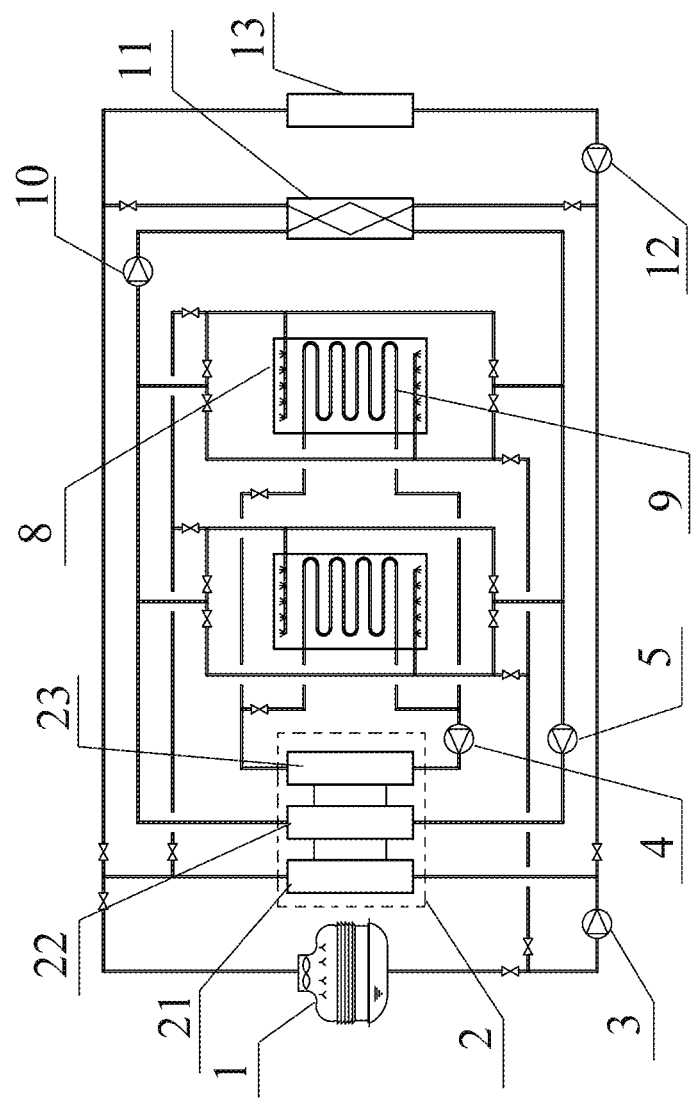
FIG. 8 is the schematic diagram of the third embodiment of the static coil-pipe ice-manufacturing trans-seasonal cold-storage heat-storage system.
Figure 9:
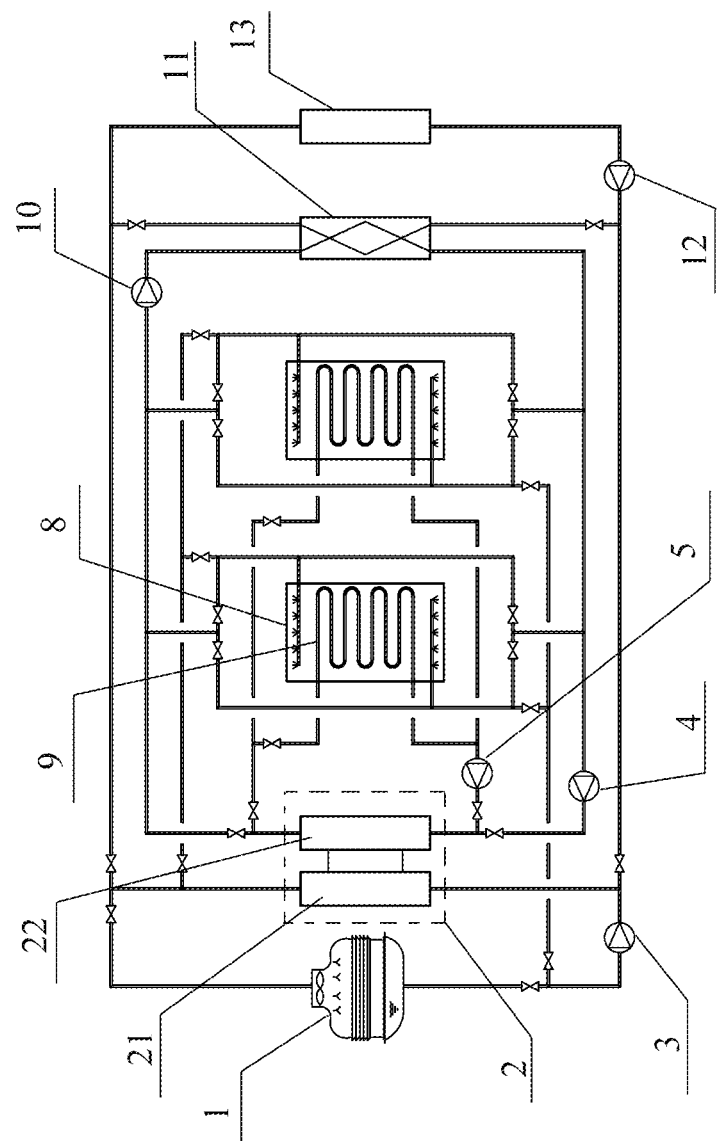
FIG. 9 is the schematic diagram of the fourth embodiment of the static coil-pipe ice-manufacturing trans-seasonal cold-storage heat-storage system.

Referring to FIGS. 8 and 9, in the third embodiment and the fourth embodiment of the static coil-pipe ice-manufacturing trans-seasonal cold-storage heat-storage system, the trans-seasonal cold-storage heat-storage system is provided therein with two trans-seasonal energy-storage tanks 8, and the two trans-seasonal energy-storage tanks 8 are connected in parallel. Certainly, in other embodiments, more trans-seasonal energy-storage tanks 8 may be connected in parallel.

The external surface of the trans-seasonal energy-storage tank 8 may be provided with a heat insulation cotton plate or other heat-insulation temperature-keeping measures. In the present embodiment, the trans-seasonal ice-storage coil pipe 9 is arranged within the trans-seasonal energy-storage tank 8 serpentine-wisely, and in other embodiments, may also be arranged within the trans-seasonal energy-storage tank in other forms.

A particular embodiment of the static coil-pipe ice-manufacturing trans-seasonal cold-storage heat-storage system: in use, the second evaporator 23 in the ice-source heat pump 2 communicates sequentially with the ice-source pump 5 and the trans-seasonal ice-storage coil pipe 9, wherein the pipeline is filled with an antifreezing agent, to form a circulation for a lower-temperature heat source in winter heat supplying, and also serve as a cold source for trans-seasonal cold storage, which is referred to as static ice manufacturing because the ice is static. The ice-source heat pump 2 conducts the cold production simultaneously with the heat production, and stores the cold within the trans-seasonal energy-storage tank 8 in the form of ice via the trans-seasonal ice-storage coil pipe 9. The condenser 21 in the ice-source heat pump 2 communicates sequentially with the air conditioning pump 12 and the air conditioning cold and heat terminal 13, and the ice-source heat pump 2 uses the sensible heat and latent heat of the water within the trans-seasonal energy-storage tank 8 as the lower-temperature heat source to conduct heat production, and transports to the air conditioning cold and heat terminal 13 via the air conditioning pump 12.

Referring to FIGS. 10-18, the second technical solution that is provided by the present invention: a dynamic ice-manufacturing trans-seasonal cold-storage heat-storage system, wherein the system comprises a cooling tower 1, an ice-source heat pump 2, a cooling heat-storage pump 3, a cold-storage pump 4, an ice-source pump 5, an ice-slurry pump 6, an ice-making machine set 7, a trans-seasonal energy-storage tank 8, an exergonic pump 10, an exergonic heat exchanger 11, an air conditioning pump 12 and an air conditioning cold and heat terminal 13, wherein the ice-source heat pump 2 comprises a condenser 21 and an evaporator; the condenser 21 in the ice-source heat pump 2 communicates sequentially with the cooling heat-storage pump 3 and the cooling tower 1 via a circulation pipeline, to form a circulation loop for exhausting heat to an outdoor environment in summer cold supplying, the condenser 21 in the ice-source heat pump 2 further communicates sequentially with the cooling heat-storage pump 3 and the trans-seasonal energy-storage tank 8 via a circulation pipeline, to form a circulation loop for conducting trans-seasonal heat storage to the trans-seasonal energy-storage tank 8 in summer cold supplying, and the condenser 21 in the ice-source heat pump 2 further communicates sequentially with the air conditioning pump 12 and the air conditioning cold and heat terminal 13 via a circulation pipeline, to form a circulation loop for supplying heat to the air conditioning cold and heat terminal 13 in winter; the evaporator in the ice-source heat pump 2 communicates sequentially with the cold-storage pump 4 and the trans-seasonal energy-storage tank 8 via a circulation pipeline, to form a circulation loop for conducting cold storage to the trans-seasonal energy-storage tank 8 in summer cold supplying, the evaporator in the ice-source heat pump 2 further communicates sequentially with the exergonic pump 10 and the exergonic heat exchanger 11 via a circulation pipeline, to form a circulation loop for releasing cold to the exergonic heat exchanger 11 in summer cold supplying, and the evaporator in the ice-source heat pump 2 further communicates sequentially with the ice-source pump 5 and the ice-making machine set 7 via a circulation pipeline, wherein the pipeline is filled with an antifreezing agent, to form a circulation loop for a lower-temperature heat source in winter heat supplying, and also serve as a cold source for trans-seasonal cold storage; and the ice-making machine set 7 communicates sequentially with the ice-slurry pump 6 and the trans-seasonal energy-storage tank 8 via a circulation pipeline, to form a trans-seasonal cold storage circulation loop, the trans-seasonal energy-storage tank 8 communicates sequentially with the exergonic pump 10 and the exergonic heat exchanger 11 via a circulation pipeline, to form an exergonic circulation loop for summer cold releasing and winter heat releasing, and the exergonic heat exchanger 11 further communicates sequentially with the air conditioning pump 12 and the air conditioning cold and heat terminal 13 via a circulation pipeline, to form a circulation loop for summer cold supplying and winter heat supplying of the air conditioning cold and heat terminal 13.

Figure 10:
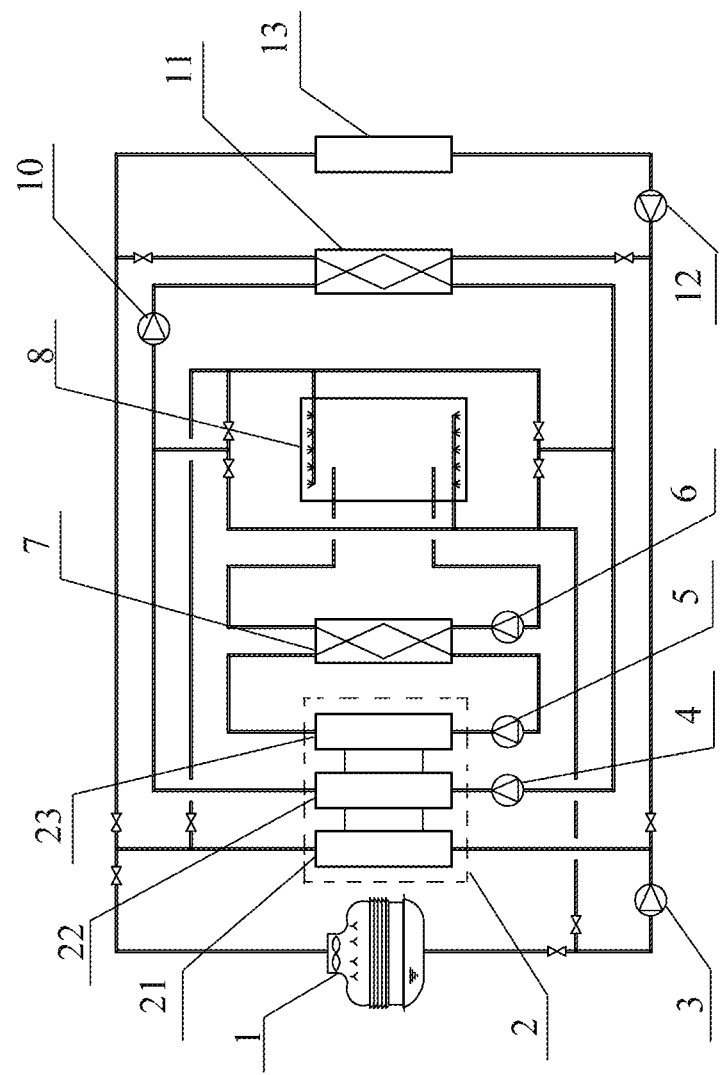
FIG. 10 is the schematic diagram of the first embodiment of the dynamic ice-manufacturing trans-seasonal cold-storage heat-storage system.
Figure 11:
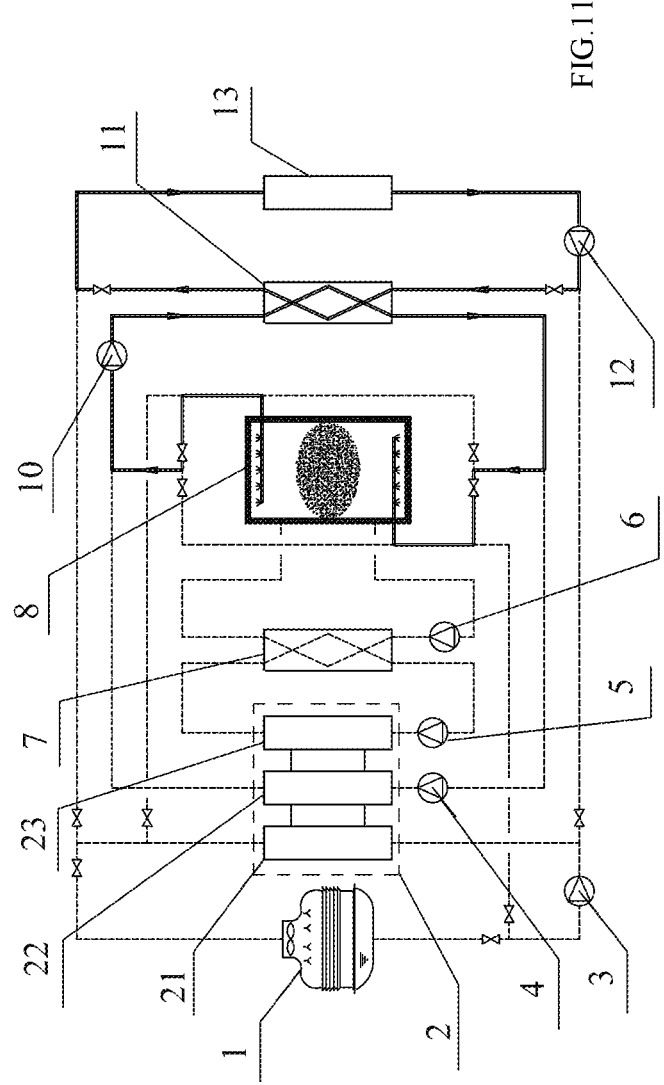
FIG. 11 is the schematic diagram of the direct heat supplying by the trans-seasonal energy-storage tank in winter of the first embodiment of the dynamic ice-manufacturing trans-seasonal cold-storage heat-storage system.
Figure 12:
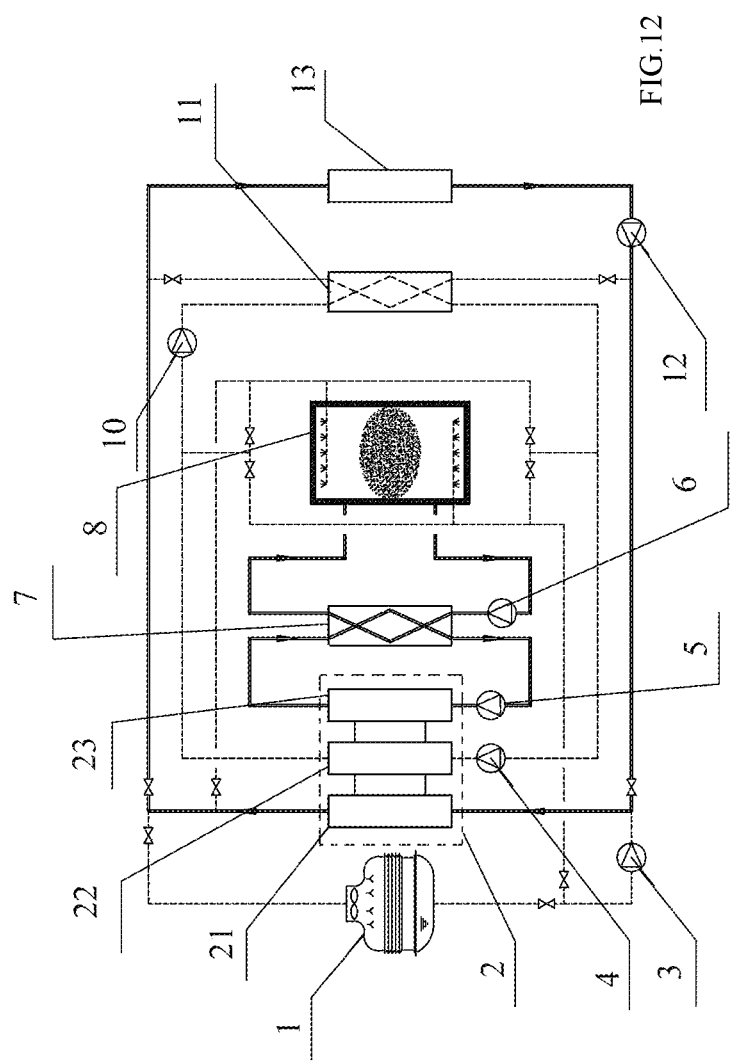
FIG. 12 is the schematic diagram of the heat supplying and trans-seasonal cold storage by the heat pump in winter of the first embodiment of the dynamic ice-manufacturing trans-seasonal cold-storage heat-storage system.
Figure 13:
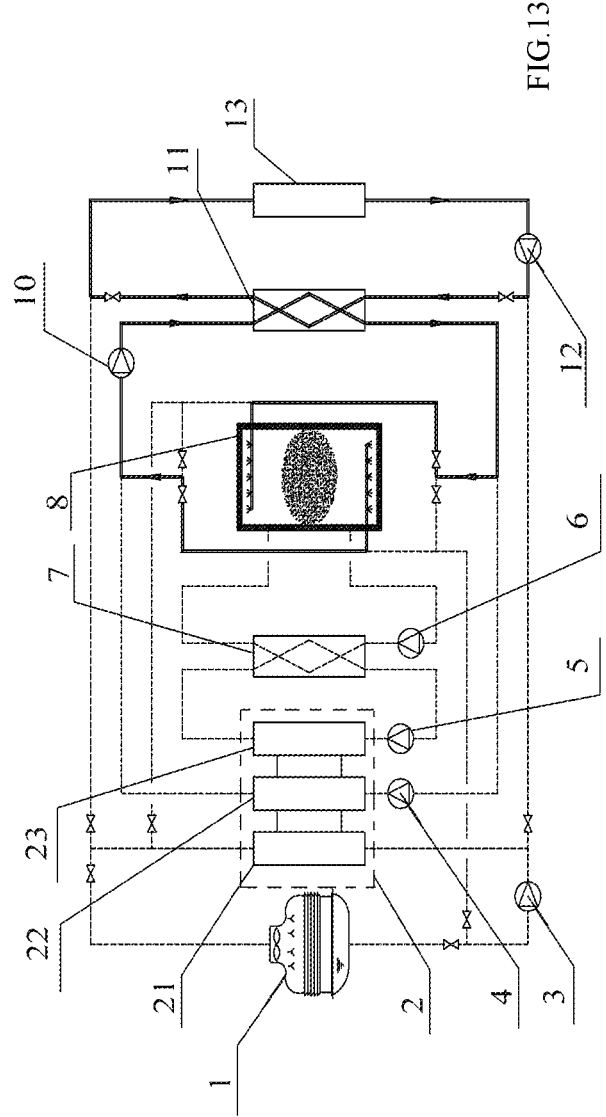
FIG. 13 is the schematic diagram of the direct cold supplying by the trans-seasonal energy-storage tank in summer of the first embodiment of the dynamic ice-manufacturing trans-seasonal cold-storage heat-storage system.
Figure 14:
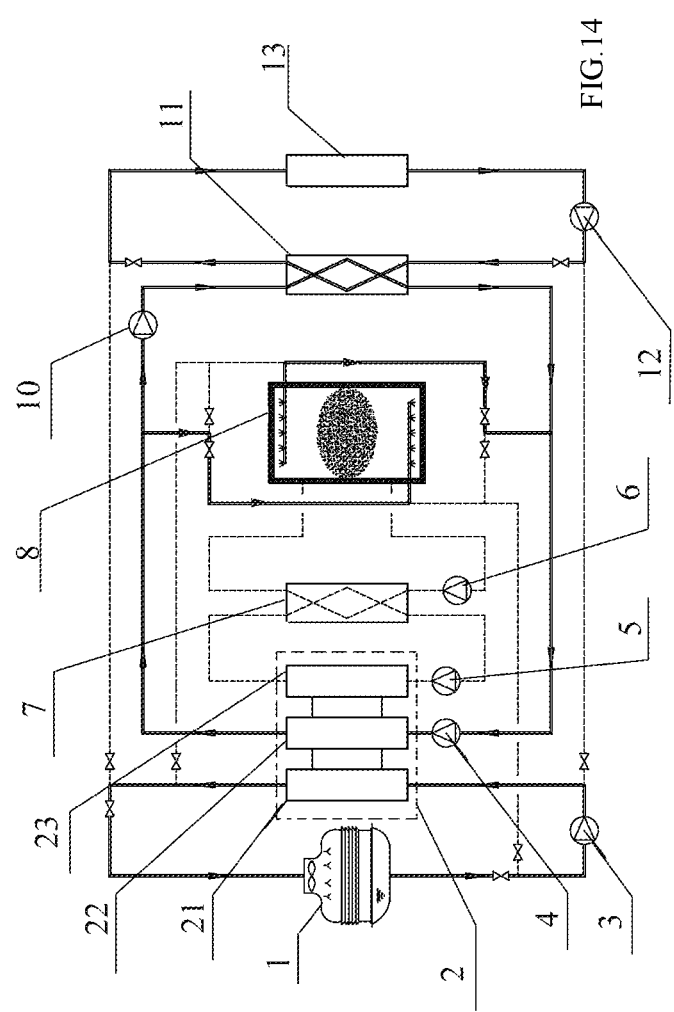
FIG. 14 is the schematic diagram of the cold storage and cold supplying by the ice-source heat pump in summer of the first embodiment of the dynamic ice-manufacturing trans-seasonal cold-storage heat-storage system.
Figure 15:
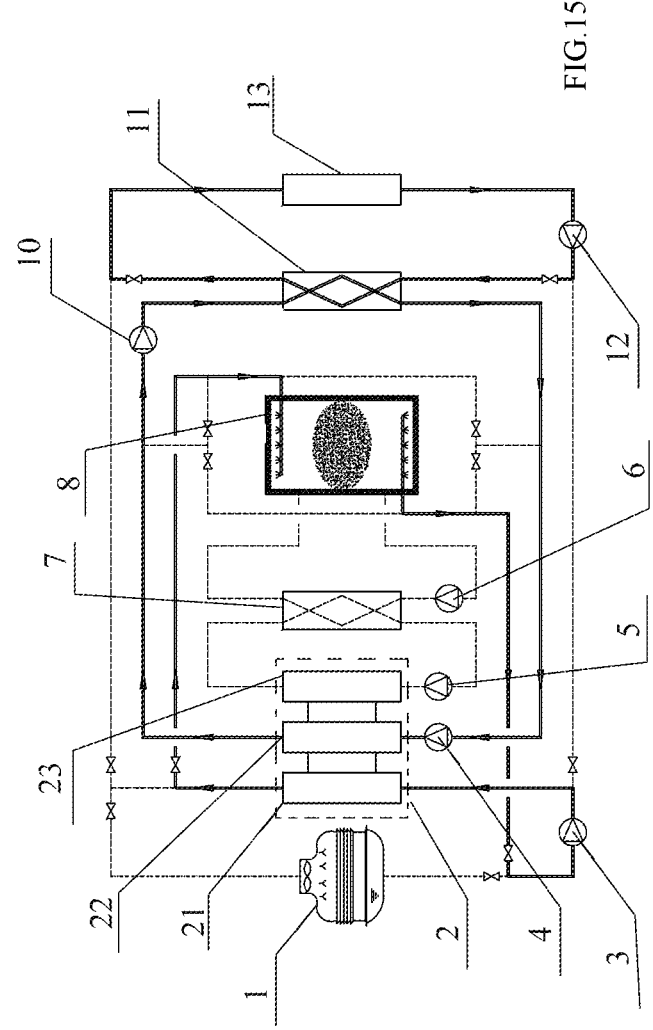
FIG. 15 is the schematic diagram of the cold supplying by the heat pump and trans-seasonal heat storage in summer of the first embodiment of the dynamic ice-manufacturing trans-seasonal cold-storage heat-storage system.

Referring to FIG. 10, in the first embodiment of the dynamic ice-manufacturing trans-seasonal cold-storage heat-storage system, the ice-source heat pump 2 is provided therein with one first evaporator 22 and one second evaporator 23, wherein the first evaporator 22 communicates sequentially with the cold-storage pump 4 and the trans-seasonal energy-storage tank 8 via a circulation pipeline, to form a circulation loop for conducting cold storage to the trans-seasonal energy-storage tank 8 in summer cold supplying, the first evaporator 22 further communicates sequentially with the exergonic pump 10 and the exergonic heat exchanger 11 via a circulation pipeline, to form a circulation loop for releasing cold to the exergonic heat exchanger 11 in summer cold supplying, and the second evaporator 23 communicates sequentially with the ice-source pump 5 and the ice-making machine set 7 via a circulation pipeline, wherein the pipeline is filled with an antifreezing agent, to form a circulation loop for a lower-temperature heat source in winter heat supplying, and also serve as a cold source for trans-seasonal cold storage.

Figure 16:
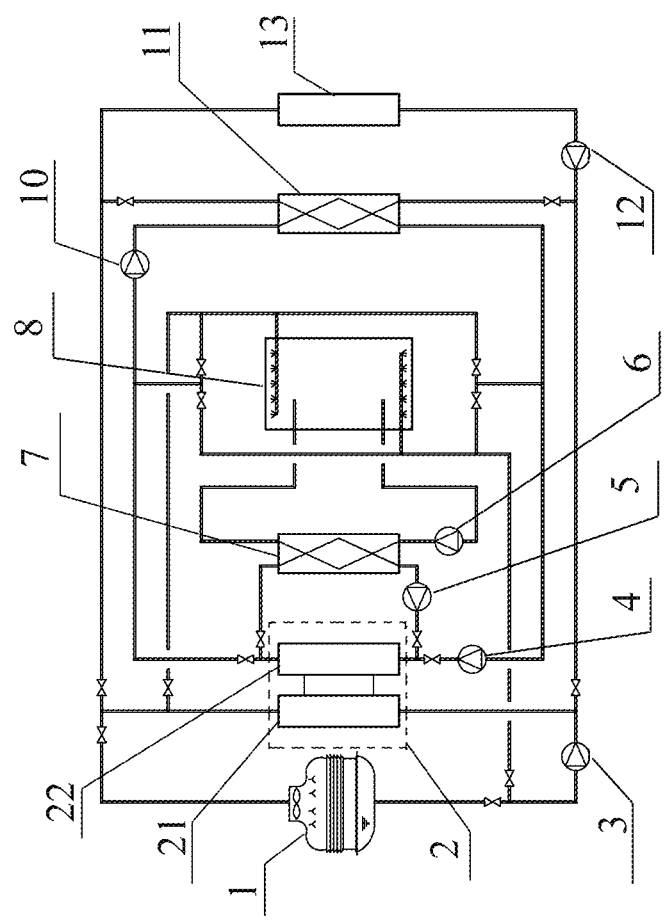
FIG. 16 is the schematic diagram of the second embodiment of the dynamic ice-manufacturing trans-seasonal cold-storage heat-storage system.

Referring to FIG. 16, in the second embodiment of the dynamic ice-manufacturing trans-seasonal cold-storage heat-storage system, the ice-source heat pump 2 is provided therein with one first evaporator 22, wherein the first evaporator 22 communicates sequentially with the cold-storage pump 4 and the trans-seasonal energy-storage tank 8 via a circulation pipeline, to form a circulation loop for conducting cold storage to the trans-seasonal energy-storage tank 8 in summer cold supplying, the first evaporator 22 further communicates sequentially with the exergonic pump 10 and the exergonic heat exchanger 11 via a circulation pipeline, to form a circulation loop for releasing cold to the exergonic heat exchanger 11 in summer cold supplying, and the first evaporator 22 further communicates sequentially with the ice-source pump 5 and the ice-making machine set 7 via a circulation pipeline, wherein the pipeline is filled with an antifreezing agent, to form a circulation loop for a lower-temperature heat source in winter heat supplying, and also serve as a cold source for trans-seasonal cold storage.

Referring to FIGS. 10 and 16, in the first embodiment and the second embodiment of the dynamic ice-manufacturing trans-seasonal cold-storage heat-storage system, the trans-seasonal cold-storage heat-storage system is provided therein with one trans-seasonal energy-storage tank 8.

Figure 17:
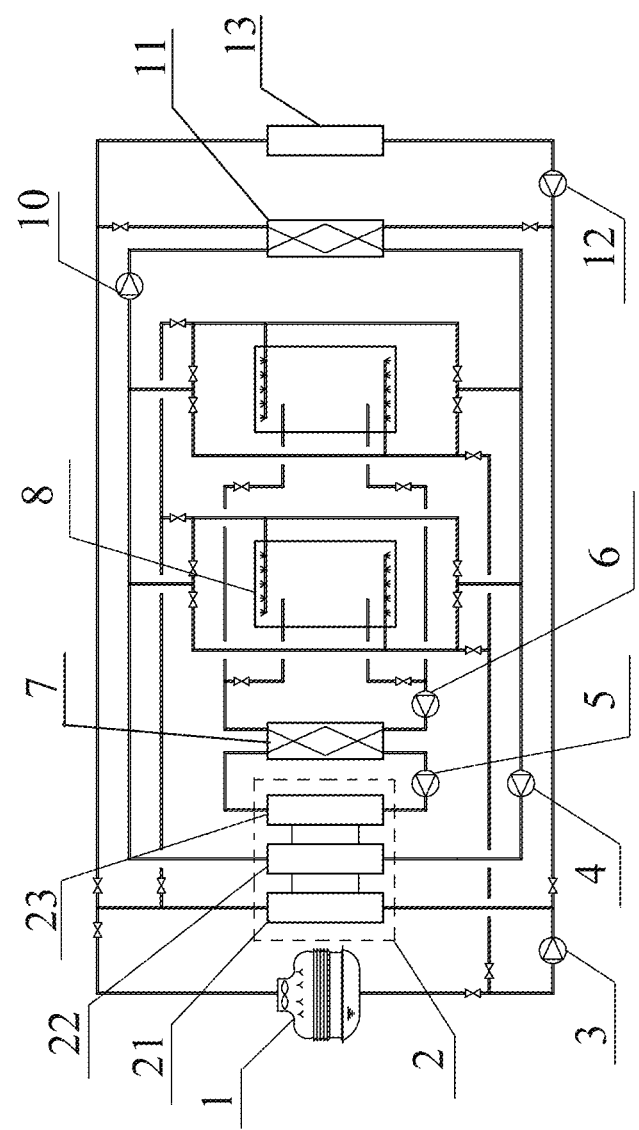
FIG. 17 is the schematic diagram of the third embodiment of the dynamic ice-manufacturing trans-seasonal cold-storage heat-storage system.
Figure 18:
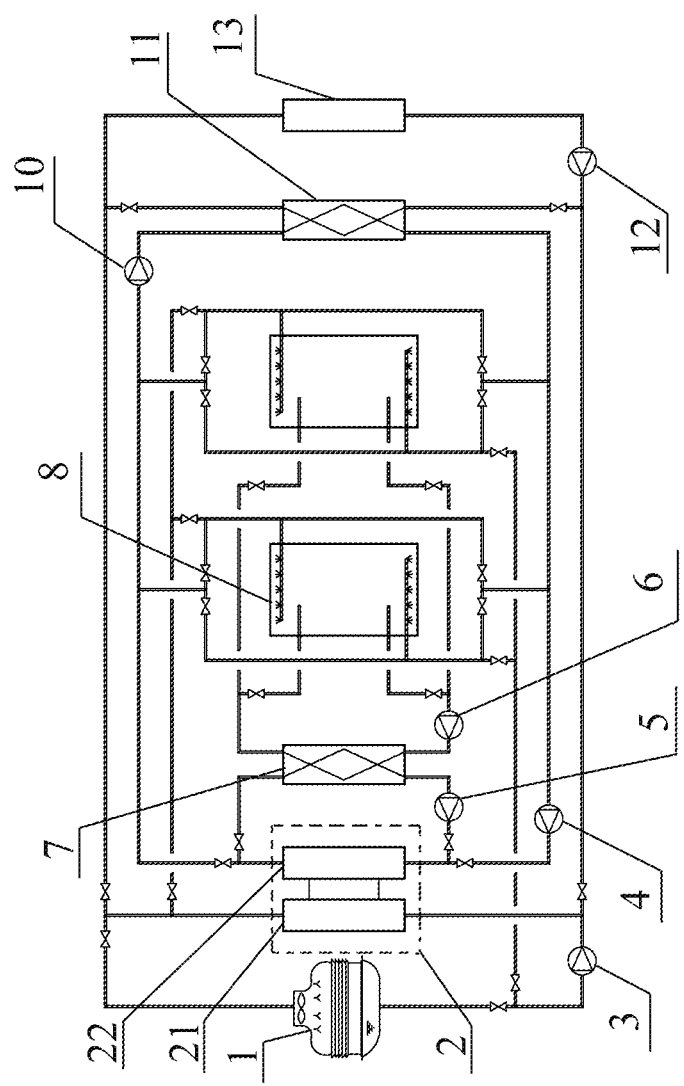
FIG. 18 is the schematic diagram of the fourth embodiment of the dynamic ice-manufacturing trans-seasonal cold-storage heat-storage system.

Referring to FIGS. 17 and 18, in the third embodiment and the fourth embodiment of the dynamic ice-manufacturing trans-seasonal cold-storage heat-storage system, the trans-seasonal cold-storage heat-storage system is provided therein with two trans-seasonal energy-storage tanks 8, and the two trans-seasonal energy-storage tanks 8 are connected in parallel. Certainly, and in other embodiments, more trans-seasonal energy-storage tanks 8 may be connected in parallel.

The external surface of the trans-seasonal energy-storage tank 8 may be provided with a heat insulation cotton plate or other heat-insulation temperature-keeping measures.

A particular embodiment of the dynamic ice-manufacturing trans-seasonal cold-storage heat-storage system: in use, the water or other secondary refrigerants that come out of the trans-seasonal energy-storage tank 8 in the cold storing is of a liquid state before entering the ice-making machine set 7, the ice-making machine set 7 conducts cold production and crystallization to the water, and the secondary refrigerant discharged by the ice-making machine set 7 is of a mixed state of ice slurry, water or other secondary refrigerants, and then enters the trans-seasonal energy-storage tank 8, which is referred to as dynamic ice manufacturing because the ice is flowing.

In the static coil-pipe ice-manufacturing trans-seasonal cold-storage heat-storage system and the dynamic ice-manufacturing trans-seasonal cold-storage heat-storage system, the outlet of the air conditioning pump 12 communicates with the exergonic heat exchanger 11, the inlet of the air conditioning pump 12 communicates with the air conditioning cold and heat terminal 13, the condenser 21 is provided with a heat source outlet and a cold source inlet, the evaporator is provided with a cold source outlet and a heat source inlet, the top of the trans-seasonal energy-storage tank 8 is provided with a heat source inlet and a heat source outlet, and the bottom of the trans-seasonal energy-storage tank 8 is provided with a cold source inlet and a cold source outlet.

In heat releasing, the exergonic pump 10 sucks from the top of the trans-seasonal energy-storage tank 8 the high-temperature hot water that was stored in summer and transports to the exergonic heat exchanger 11, the water, after cooling, returns to the bottom of the trans-seasonal energy-storage tank 8, the air conditioning pump 12 transports the heat in the exergonic heat exchanger 11 to the air conditioning cold and heat terminal 13, and the air conditioning cold and heat terminal 13 conducts heat production operation to the indoor space, thereby realizing the function of storing the heat discharged during cold production in summer to be used for heat supplying in winter. In cold releasing, the exergonic pump 10 sucks from the bottom of the trans-seasonal energy-storage tank 8 the low-temperature cold water that was stored in summer and transports to the exergonic heat exchanger 11, the water, after cooling, returns to the top of the trans-seasonal energy-storage tank 8, the air conditioning pump 12 transports the cold air in the exergonic heat exchanger 11 to the air conditioning cold and heat terminal 13, and the air conditioning cold and heat terminal 13 conducts cold production operation to the indoor space, thereby realizing the function of energy storage and cold production.

The trans-seasonal cold-storage heat-storage system can realize conducting direct cold supplying operation in winter by directly using the trans-seasonal energy-storage tank 8, which comprises two circulations. One circulation is the heat releasing circulation that is formed by the exergonic pump 10, the trans-seasonal energy-storage tank 8 and the exergonic heat exchanger 11, wherein in heat releasing, the exergonic pump 10 sucks from the top of the trans-seasonal energy-storage tank 8 the high-temperature hot water that was stored in summer and transports to the exergonic heat exchanger 11, and the water, after cooling, returns to the bottom of the trans-seasonal energy-storage tank 8. The other circulation is a winter trans-seasonal heat releasing and heat supplying circulation that is formed by the air conditioning pump 12, the exergonic heat exchanger 11 and the air conditioning cold and heat terminal 13.

The cold supplying operation of the trans-seasonal cold-storage heat-storage system comprises two circulations. One circulation is the cold releasing circulation that is formed by the exergonic pump 10, the trans-seasonal energy-storage tank 8 and the exergonic heat exchanger 11, wherein in cold releasing, the exergonic pump 10 sucks from the bottom of the trans-seasonal energy-storage tank 8 the low-temperature cold water that was stored in summer and transports to the exergonic heat exchanger 11, and the water, after cooling, returns to the top of the trans-seasonal energy-storage tank 8. The other circulation is a summer trans-seasonal cold releasing and cold supplying circulation that is formed by the air conditioning pump 12, the exergonic heat exchanger 11 and the air conditioning cold and heat terminal 13.

The trans-seasonal cold-storage heat-storage system realizes conducting everyday cold storage and cold releasing operations by directly using the ice-source heat pump 2 in the middle of summer, to realize the object of reducing the peak and filling the trough to reduce the operation cost. The condenser 21 communicates sequentially with the cooling heat-storage pump 3 and the cooling tower 1, to discharge the heat that is discharged by the ice-source heat pump 2 during the cold production by the system to the outdoor space via the cooling heat-storage pump 3 and the cooling tower 1. The evaporator, the cold-storage pump 4, the trans-seasonal energy-storage tank 8, the exergonic pump 10 and the exergonic heat exchanger 11 form a cold storage and cold releasing circulation. In the time period of nighttime trough electricity price, the cold production by the ice-source heat pump 2 conducts water cold storage to the trans-seasonal energy-storage tank 8, and in the time period of daytime peak electricity price, the trans-seasonal energy-storage tank 8 conducts cold releasing. The ice-source heat pump 2 and the trans-seasonal energy-storage tank 8 may also conduct combined cold supplying, wherein the air conditioning pump 12, the exergonic heat exchanger 11 and the air conditioning cold and heat terminal 13 sequentially communicate, and the cold of the ice-source heat pump 2 and the cold of the trans-seasonal energy-storage tank 8 are supplied to the air conditioning cold and heat terminal 13 via the exergonic heat exchanger 11 and the air conditioning pump 12.

The trans-seasonal cold-storage heat-storage system realizes conducting cold production by using the ice-source heat pump 2 at the end of summer, and also conducting trans-seasonal heat storage to the trans-seasonal energy-storage tank 8 by using the waste heat that was generated during the cold production by the ice-source heat pump 2. The condenser 21 communicates sequentially with the cooling heat-storage pump 3 and the trans-seasonal energy-storage tank 8, and the cooling heat-storage pump 3 and the trans-seasonal energy-storage tank 8 conduct trans-seasonal storage to the waste heat that was generated during the cold production by the ice-source heat pump 2. At this point the ice-source heat pump 2 is in the direct cold supplying operating mode, and does not conduct the operation of the cold storage operating mode. The cold of the ice-source heat pump 2 is supplied to the air conditioning cold and heat terminal 13 via the cold-storage pump 4, the exergonic pump 10 and the exergonic heat exchanger 11. The air conditioning pump 12, the exergonic heat exchanger 11 and the air conditioning cold and heat terminal 13 sequentially communicate, and the cold of the ice-source heat pump 2 and the cold of the trans-seasonal energy-storage tank 8 are provided to the air conditioning cold and heat terminal 13 via the exergonic heat exchanger 11 and the air conditioning pump 12.

The above description displays and describes the fundamental principles and primary characteristics of the present invention and the advantages of the present invention. For a person skilled in the art, apparently the present invention is not limited to the details of the above illustrative embodiments, and the present invention can be implemented in other concrete forms without deviating from the spirit or basic features of the present invention. Therefore, in every respect, the embodiments should be deemed as exemplary, and non-limiting. The scope of the present invention is defined by the attached claims rather than the above description, and therefore all of the variations that fall within the meanings and scopes of the equivalent elements of the claims are intended to be incorporated into the present invention. No reference number in the claims should be deemed as limiting the involved claim.

Furthermore, it should be understood that, although the description is described according to the embodiments, each of the embodiments does not comprise merely one independent technical solution, and the way of expression of the description is merely for sake of clarity. A person skilled in the art should deem the description as integral, and the technical solutions in the embodiments may be properly combined, to form other embodiments that a person skilled in the art can understand.

We claim:

1. A static coil-pipe ice-manufacturing trans-seasonal cold-storage heat-storage system, wherein: the system comprises a cooling tower (1), an ice-source heat pump (2), a cooling heat-storage pump (3), a cold-storage pump (4), an ice-source pump (5), a trans-seasonal energy-storage tank (8), a trans-seasonal ice-storage coil pipe (9), an exergonic pump (10), an exergonic heat exchanger (11), an air conditioning pump (12) and an air conditioning cold and heat terminal (13), wherein the ice-source heat pump (2) comprises a condenser (21) and an evaporator, and the trans-seasonal ice-storage coil pipe (9) is provided within the trans-seasonal energy-storage tank (8);

the condenser (21) in the ice-source heat pump (2) communicates sequentially with the cooling heat-storage pump (3) and the cooling tower (1) via a circulation pipeline, to form a circulation loop for exhausting heat to an outdoor environment in summer cold supplying, the condenser (21) in the ice-source heat pump (2) further communicates sequentially with the cooling heat-storage pump (3) and the trans-seasonal energy-storage tank (8) via a circulation pipeline, to form a circulation loop for conducting trans-seasonal heat storage to the trans-seasonal energy-storage tank (8) in summer cold supplying, and the condenser (21) in the ice-source heat pump (2) further communicates sequentially with the air conditioning pump (12) and the air conditioning cold and heat terminal (13) via a circulation pipeline, to form a circulation loop for supplying heat to the air conditioning cold and heat terminal (13) in winter;

the evaporator in the ice-source heat pump (2) communicates sequentially with the cold-storage pump (4) and the trans-seasonal energy-storage tank (8) via a circulation pipeline, to form a circulation loop for conducting cold storage to the trans-seasonal energy-storage tank (8) in summer cold supplying, the evaporator in the ice-source heat pump (2) further communicates sequentially with the exergonic pump (10) and the exergonic heat exchanger (11) via a circulation pipeline, to form a circulation loop for releasing cold to the exergonic heat exchanger (11) in summer cold supplying, and the evaporator in the ice-source heat pump (2) further communicates sequentially with the ice-source pump (5) and the trans-seasonal ice-storage coil pipe (9) via a circulation pipeline, wherein the pipeline is filled with an antifreezing agent, to form a circulation loop for a lower-temperature heat source in winter heat supplying, and also serve as a cold source for trans-seasonal cold storage; and the trans-seasonal energy-storage tank (8) communicates sequentially with the exergonic pump (10) and the exergonic heat exchanger (11) via a circulation pipeline, to form an exergonic circulation loop for summer cold releasing and winter heat releasing, and the exergonic heat exchanger (11) further communicates sequentially with the air conditioning pump (12) and the air conditioning cold and heat terminal (13) via a circulation pipeline, to form a circulation loop for summer cold supplying and winter heat supplying of the air conditioning cold and heat terminal (13).

2. The static coil-pipe ice-manufacturing trans-seasonal cold-storage heat-storage system according to claim 1, wherein: the ice-source heat pump (2) is provided therein with one first evaporator (22), wherein the first evaporator (22) communicates sequentially with the cold-storage pump (4) and the trans-seasonal energy-storage tank (8) via a circulation pipeline, to form a circulation loop for conducting cold storage to the trans-seasonal energy-storage tank (8) in summer cold supplying, the first evaporator (22) further communicates sequentially with the exergonic pump (10) and the exergonic heat exchanger (11) via a circulation pipeline, to form a circulation loop for releasing cold to the exergonic heat exchanger (11) in summer cold supplying, and the first evaporator (22) further communicates sequentially with the ice-source pump (5) and the trans-seasonal ice-storage coil pipe (9) via a circulation pipeline, wherein the pipeline is filled with an antifreezing agent, to form a circulation loop for a lower-temperature heat source in winter heat supplying, and also serve as a cold source for trans-seasonal cold storage;

or the ice-source heat pump (2) is provided therein with one first evaporator (22) and one second evaporator (23), wherein the first evaporator (22) communicates sequentially with the cold-storage pump (4) and the trans-seasonal energy-storage tank (8) via a circulation pipeline, to form a circulation loop for conducting cold storage to the trans-seasonal energy-storage tank (8) in summer cold supplying, the first evaporator (22) further communicates sequentially with the exergonic pump (10) and the exergonic heat exchanger (11) via a circulation pipeline, to form a circulation loop for releasing cold to the exergonic heat exchanger (11) in summer cold supplying, and the second evaporator (23) further communicates sequentially with the ice-source pump (5) and the trans-seasonal ice-storage coil pipe (9) via a circulation pipeline, wherein the pipeline is filled with an antifreezing agent, to form a circulation loop for a lower-temperature heat source in winter heat supplying, and also serve as a cold source for trans-seasonal cold storage.

3. The static coil-pipe ice-manufacturing trans-seasonal cold-storage heat-storage system according to claim 1, wherein: the static coil-pipe ice-manufacturing trans-seasonal cold-storage heat-storage system is provided therein with one trans-seasonal energy-storage tank (8), or the trans-seasonal cold-storage heat-storage system is provided therein with a plurality of trans-seasonal energy-storage tanks (8), and the plurality of trans-seasonal energy-storage tanks (8) are connected in parallel.

4. The static coil-pipe ice-manufacturing trans-seasonal cold-storage heat-storage system according to claim 1, wherein: an external surface of the trans-seasonal energy-storage tank (8) is provided with a heat insulation cotton plate.

5. The static coil-pipe ice-manufacturing trans-seasonal cold-storage heat-storage system according to claim 1, wherein: the trans-seasonal ice-storage coil pipe (9) is arranged within the trans-seasonal energy-storage tank (8) serpentine-wisely.

6. A dynamic ice-manufacturing trans-seasonal cold-storage heat-storage system, wherein: the system comprises a cooling tower (1), an ice-source heat pump (2), a cooling heat-storage pump (3), a cold-storage pump (4), an ice-source pump (5), an ice-slurry pump (6), an ice-making machine set (7), a trans-seasonal energy-storage tank (8), an exergonic pump (10), an exergonic heat exchanger (11), an air conditioning pump (12) and an air conditioning cold and heat terminal (13), wherein the ice-source heat pump (2) comprises a condenser (21) and an evaporator;

the condenser (21) in the ice-source heat pump (2) communicates sequentially with the cooling heat-storage pump (3) and the cooling tower (1) via a circulation pipeline, to form a circulation loop for exhausting heat to an outdoor environment in summer cold supplying, the condenser (21) in the ice-source heat pump (2) further communicates sequentially with the cooling heat-storage pump (3) and the trans-seasonal energy-storage tank (8) via a circulation pipeline, to form a circulation loop for conducting trans-seasonal heat storage to the trans-seasonal energy-storage tank (8) in summer cold supplying, and the condenser (21) in the ice-source heat pump (2) further communicates sequentially with the air conditioning pump (12) and the air conditioning cold and heat terminal (13) via a circulation pipeline, to form a circulation loop for supplying heat to the air conditioning cold and heat terminal (13) in winter;

the evaporator in the ice-source heat pump (2) communicates sequentially with the cold-storage pump (4) and the trans-seasonal energy-storage tank (8) via a circulation pipeline, to form a circulation loop for conducting cold storage to the trans-seasonal energy-storage tank (8) in summer cold supplying, the evaporator in the ice-source heat pump (2) further communicates sequentially with the exergonic pump (10) and the exergonic heat exchanger (11) via a circulation pipeline, to form a circulation loop for releasing cold to the exergonic heat exchanger (11) in summer cold supplying, and the evaporator of the ice-source heat pump (2) further communicates sequentially with the ice-source pump (5) and the ice-making machine set (7), wherein the pipeline is filled with an antifreezing agent, to form a circulation loop for a lower-temperature heat source in winter heat supplying, and also serve as a cold source for trans-seasonal cold storage; and the ice-making machine set (7) communicates sequentially with the ice-slurry pump (6) and the trans-seasonal energy-storage tank (8) via a circulation pipeline, to form a trans-seasonal cold storage circulation loop, the trans-seasonal energy-storage tank (8) communicates sequentially with the exergonic pump (10) and the exergonic heat exchanger (11) via a circulation pipeline, to form an exergonic circulation loop for summer cold releasing and winter heat releasing, and the exergonic heat exchanger (11) further communicates sequentially with the air conditioning pump (12) and the air conditioning cold and heat terminal (13) via a circulation pipeline, to form a circulation loop for summer cold supplying and winter heat supplying of the air conditioning cold and heat terminal (13).

7. The dynamic ice-manufacturing trans-seasonal cold-storage heat-storage system according to claim 6, wherein: the ice-source heat pump (2) is provided therein with one first evaporator (22), wherein the first evaporator (22) communicates sequentially with the cold-storage pump (4) and the trans-seasonal energy-storage tank (8) via a circulation pipeline, to form a circulation loop for conducting cold storage to the trans-seasonal energy-storage tank (8) in summer cold supplying, the first evaporator (22) further communicates sequentially with the exergonic pump (10) and the exergonic heat exchanger (11) via a circulation pipeline, to form a circulation loop for releasing cold to the exergonic heat exchanger (11) in summer cold supplying, and the first evaporator (22) further communicates sequentially with the ice-source pump (5) and the ice-making machine set (7) via a circulation pipeline, wherein the pipeline is filled with an antifreezing agent, to form a circulation loop for a lower-temperature heat source in winter heat supplying, and also serve as a cold source for trans-seasonal cold storage;

or the ice-source heat pump (2) is provided therein with one first evaporator (22) and one second evaporator (23), wherein the first evaporator (22) communicates sequentially with the cold-storage pump (4) and the trans-seasonal energy-storage tank (8) via a circulation pipeline, to form a circulation loop for conducting cold storage to the trans-seasonal energy-storage tank (8) in summer cold supplying, the first evaporator (22) further communicates sequentially with the exergonic pump (10) and the exergonic heat exchanger (11) via a circulation pipeline, to form a circulation loop for releasing cold to the exergonic heat exchanger (11) in summer cold supplying, and the second evaporator (23) communicates sequentially with the ice-source pump (5) and the ice-making machine set (7) via a circulation pipeline, wherein the pipeline is filled with an antifreezing agent, to form a circulation loop for a lower-temperature heat source in winter heat supplying, and also serve as a cold source for trans-seasonal cold storage.

8. The dynamic ice-manufacturing trans-seasonal cold-storage heat-storage system according to claim 6, wherein: the dynamic ice-manufacturing trans-seasonal cold-storage heat-storage system is provided therein with one trans-seasonal energy-storage tank (8), or the trans-seasonal cold-storage heat-storage system is provided therein with a plurality of trans-seasonal energy-storage tanks (8), and the plurality of trans-seasonal energy-storage tanks (8) are connected in parallel.

9. The dynamic ice-manufacturing trans-seasonal cold-storage heat-storage system according to claim 6, wherein: an external surface of the trans-seasonal energy-storage tank (8) is provided with a heat insulation cotton plate.

* * * * *